US008220805B2

(12) United States Patent
Monden et al.

(10) Patent No.: US 8,220,805 B2
(45) Date of Patent: Jul. 17, 2012

(54) GRIPPING METHOD FOR TURBOCHARGER HOUSING AND WORK GRIPPING DEVICE

(75) Inventors: Atsunori Monden, Fuchu (JP);
Kimihiro Kikkawa, Fuchu (JP);
Takumi Hayashi, Fuchu (JP); Teruaki Takahashi, Fuchu (JP); Yasuo Suzuki, Fuchu (JP)

(73) Assignee: Kitagawa Iron Works Co., Ltd., Hiroshima (JP)

( * ) Notice: Subject to any disclaimer, the term of this patent is extended or adjusted under 35 U.S.C. 154(b) by 1106 days.

(21) Appl. No.: 11/989,969

(22) PCT Filed: Aug. 7, 2006

(86) PCT No.: PCT/JP2006/315570
§ 371 (c)(1),
(2), (4) Date: Feb. 4, 2008

(87) PCT Pub. No.: WO2007/018166
PCT Pub. Date: Feb. 15, 2007

(65) Prior Publication Data
US 2010/0090419 A1    Apr. 15, 2010

(30) Foreign Application Priority Data
Aug. 5, 2005   (JP) .................................. 2005-228340

(51) Int. Cl.
*B23B 31/177*   (2006.01)
(52) U.S. Cl. ......................... 279/120; 279/141; 279/123
(58) Field of Classification Search .................... 29/559; 279/121, 123, 141, 118, 119, 120, 154, 155, 279/156
See application file for complete search history.

(56) References Cited

U.S. PATENT DOCUMENTS

| 1,756,970 | A | * | 5/1930 | Booth ........................... 279/106 |
| 2,050,828 | A | * | 8/1936 | Buell ............................ 279/106 |
| 2,464,507 | A | * | 3/1949 | Hohwart et al. .............. 279/139 |
| 2,890,053 | A | * | 6/1959 | Walker .......................... 279/133 |
| 2,910,301 | A | * | 10/1959 | Mann ............................ 279/156 |
| 3,076,662 | A | * | 2/1963 | Kostyrka ..................... 279/4.11 |
| 5,464,233 | A | * | 11/1995 | Hanai ............................ 279/137 |
| 5,562,007 | A | * | 10/1996 | Seymour ....................... 82/1.11 |
| 6,126,174 | A | * | 10/2000 | Reece et al. .................. 279/2.24 |
| 7,703,206 | B1 | * | 4/2010 | Gatton ........................... 29/894 |

FOREIGN PATENT DOCUMENTS
JP   63-306801    12/1988
JP    7-178608     7/1995
* cited by examiner

*Primary Examiner* — Daniel Howell
*Assistant Examiner* — Paul M Janeski
(74) *Attorney, Agent, or Firm* — DLA Piper LLP (US)

(57) ABSTRACT

[Problems]
A gripping method for a turbocharger housing and a work gripping device that can accurately grip an inner diameter using a reference for shape during casting when processing.
[Means for Solving Problems]
In a gripping method of a turbocharger housing W, an end surface Y of a large diameter hole 22 facing a small diameter hole 25 is used for positioning in an axial direction. The inner diameter of the large diameter hole 22 is then gripped. A work gripping device 1 includes a cylindrical body 2, a plunger 3 that moves back and forth along an axial direction of the body 2, a jaw 4 that moves in a radial direction of the body 2 in tandem with the plunger 3, and a pusher 6 that presses the work W in a direction away from the body 2 in accompaniment with movement of the plunger 3. The jaw 4 includes a gripping surface 24 that grips the work W and a contact surface 5 that projects in an outward radial direction from an end edge of the gripping surface 24 away from the body 2. The pusher 6 presses the work W to the contact surface 5 and the work W is gripped.

6 Claims, 10 Drawing Sheets

GRIPPING METHOD FOR TURBOCHARGER HOUSING AND WORK GRIPPING DEVICE

TECHNICAL FIELD

The present invention relates to a gripping method for a turbocharger housing and a work gripping method that are suitable for use in processing a turbocharger housing.

BACKGROUND ART

Conventionally, a turbocharger is commonly added as an additional device to an engine of an automobile and the like to augment output from or enhance exhaust efficiency of the engine. The turbocharger augments the output from and enhances the exhaust efficiency of the engine as follows. The turbocharger rotates a turbine using exhaust gas from the engine. The turbocharger then drives a compressor provided on a same axis as the turbine and compresses air drawn into the engine. The turbocharger supplies the engine with high-density air.

An example of a conventional turbocharger housing will be described with reference to FIG. 8 and FIG. 9.

Figure 8:
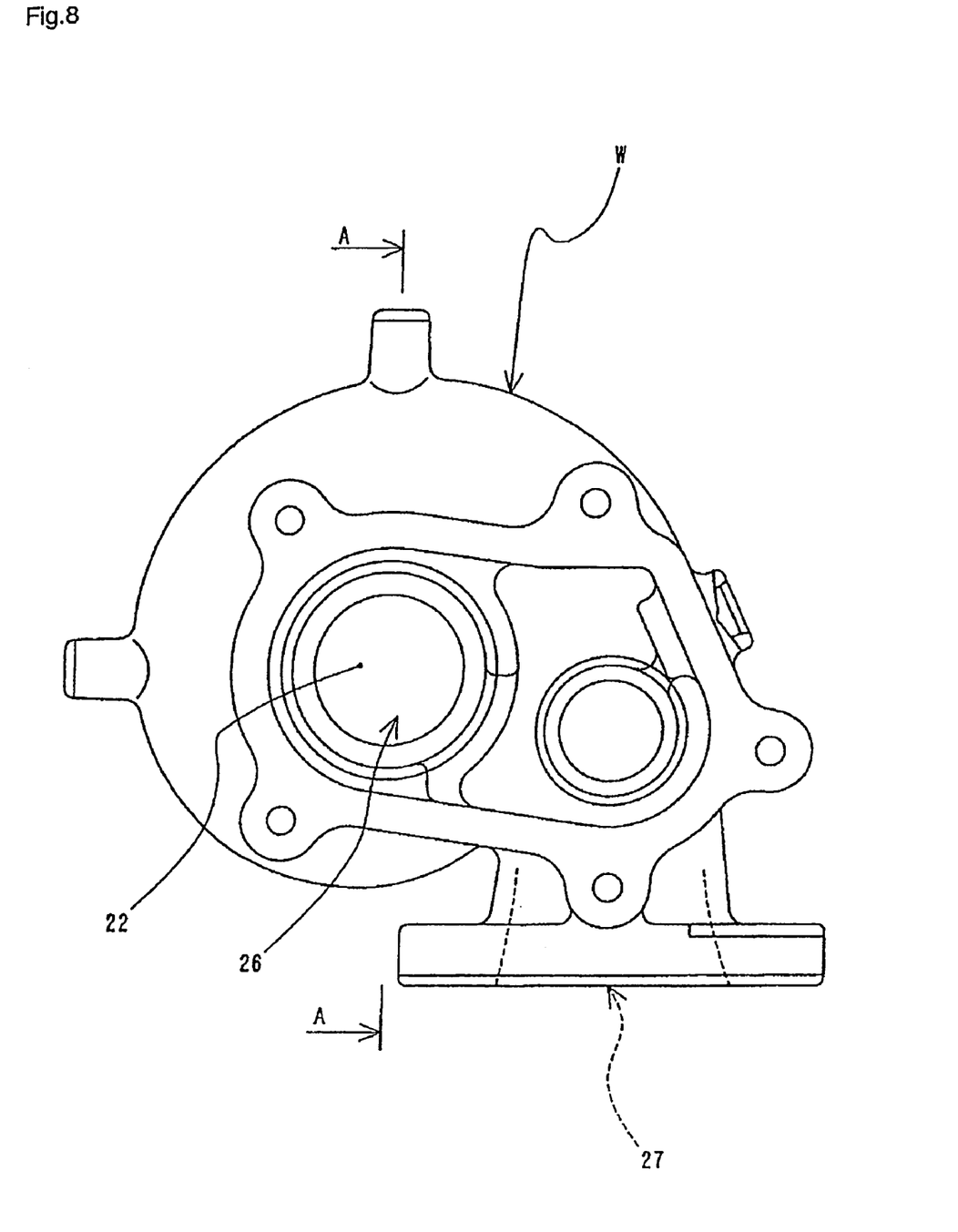
FIG. 8 is an outer appearance view of a turbocharger serving as a work.
Figure 9:
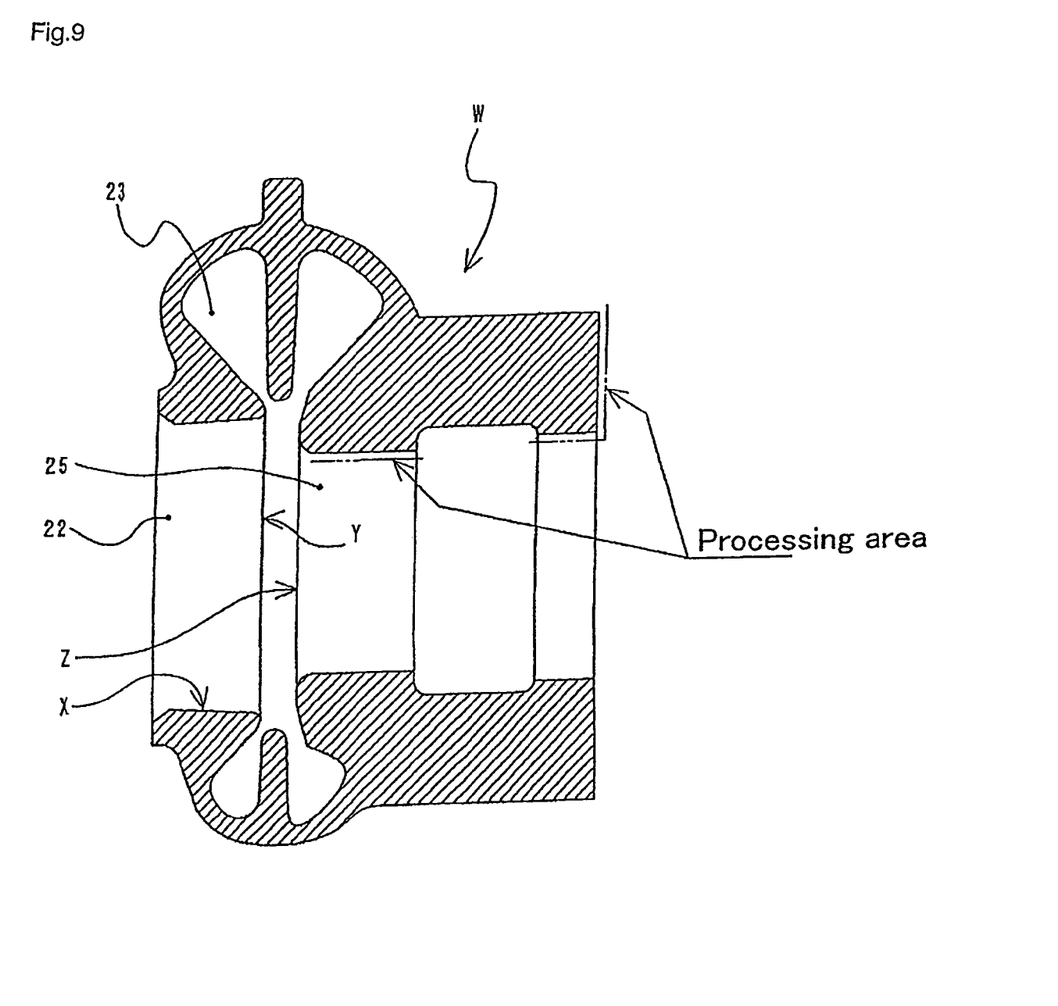
FIG. 9 is a cross-sectional view of FIG. 8 taken along line A-A.

FIG. 8 and FIG. 9 show the conventional turbocharger housing. FIG. 8 is a front view of main components. FIG. 9 is a cross-sectional view of the main components taken along line A-A.

As shown in FIG. 8 and FIG. 9, a conventional turbocharger housing W includes a scroll 23. The scroll 23 is formed such as to spiral from an axial center, similar to a shape of a snail. A large diameter hole 22 and a small diameter hole 25 are provided in the axial center of the scroll 23. The small diameter hole 25 has a smaller diameter than the large diameter hole 22. The large diameter hole 22 and the small diameter hole 25 are disposed along an axial direction of the scroll 23 such as to face each other with space therebetween. A turbine rotor (not shown) is stored in the axial center of the scroll 23. A rotation axis is held within the small diameter hole 25 by a bearing such as to rotate freely (neither the rotation axis nor the bearing are shown). The turbine rotor is provided on one end of the rotation axis positioned on the scroll side. An opening end of the large diameter hole 11 that is exposed outwardly, shown on the left-hand side in FIG. 9, is an outlet 26 for fluid (exhaust gas) that drives the turbine rotor. An opening end opposite to the axial center of the scroll 23 is an inlet 27 for the exhaust gas serving as the fluid that drives the turbine rotor.

In the conventional turbocharger housing W such as this, the scroll 23 has a complex shape. Therefore, the turbocharger housing W is made by a casting alloy, such as nodular graphite cast-iron, being cast and then cut (for example, refer to Patent Literature 1).

The turbocharger housing W is a work serving as a processing subject subjected to processing. The turbocharger housing W has a complex, spiraling outer shape. Therefore, gripping of the outer shape is difficult. As a result, when a cutting-finishing processing for processing the small diameter hole 25 is performed, the processing is performed while an inner diameter of the large diameter hole 22 is gripped. An example of a processing area of the small diameter hole 25 in the turbocharger housing W is indicated by a double-dotted line in FIG. 9.

An inner diameter gripping state of the turbocharger housing by a conventional work gripping device will be described with reference to FIG. 10.

Figure 10:
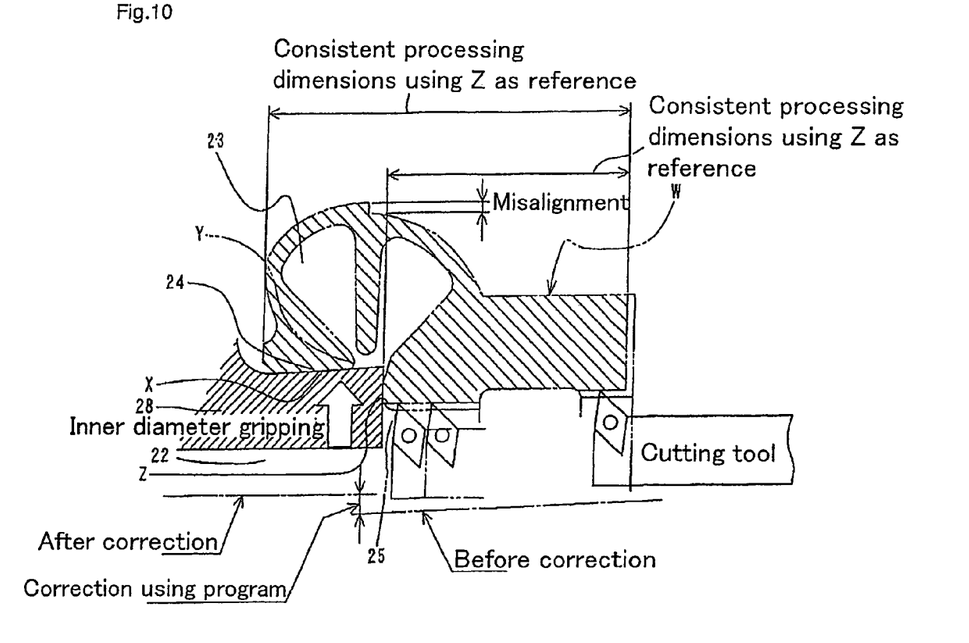
FIG. 10 is an enlarged partial cross-sectional view of an inner diameter gripping state of the turbocharger housing by a conventional work gripping device.

FIG. 10 is a partially enlarged cross-sectional view of a main section in the inner diameter gripping state of the processing-subject turbocharger housing by the conventional work gripping device.

As shown in FIG. 10, the inner diameter of the turbocharger housing W, formed by casting and subjected to processing as the work, is gripped as follows. The large diameter hole 22 of the turbocharger housing W is fitted onto a jaw (claw) 28 of a chuck (not shown). The chuck serves as the work gripping device. The turbocharger housing W is pushed onto the jaw 28 until an end surface Z of the small diameter hole 25 facing the large diameter hole 22 comes into contact with a tip of the jaw 28. The turbocharger housing W that is pushed onto the jaw 28 until contact is made is positioned in an axial direction using the end surface Z of the small diameter hole 25. In this position, the jaw 28 moves in an outward radial direction. A gripping surface 24 of the jaw 28 grips the inner diameter of the large diameter hole 22 of the turbocharger housing W. Therefore, a reference for the gripping position in the axial direction during processing is the position of the end surface Z of the small diameter hole 25 with which the jaw 28 of the chuck comes into contact. In other words, during processing, positioning of the turbocharger housing W in the axial direction is made using the end surface Z of the small diameter hole 25 as a reference surface for positioning in the axial direction. The end surface Z faces the large diameter hole 22.

Patent Literature 1: Japanese Patent Laid-open Publication No. Showa 53-306801

DISCLOSURE OF THE INVENTION

Problems to be Resolved by the Invention

However, following problems arise in the cutting processing of the conventional turbocharger housing W produced by casting.

When casting, the turbocharger housing W subjected to processing as the work is formed with an inner circumferential surface X of the large diameter hole 22 and the end surface Z of the small diameter hole 25 facing the large diameter hole 22 as references for the shape, as shown in FIG. 9.

Here, the references for the shape in the present specification refers to references during formation of a cast used when the turbocharger housing W is cast. In other words, as described above, the turbocharger housing W includes hollow sections within, such as the large diameter hole 25, the scroll 23, and the small diameter hole 25. To form the cast of such a casting, the outer shape portion of the casting is formed by the outside of the cast. The interior space is formed by a core. Therefore, when the cast is formed, the shape is determined by placement of the core. Thus, reference for forming the core itself is prescribed as the reference for the shape of the cast, namely the turbocharger housing W formed by the casting subjected to processing as the work.

In the conventional inner diameter gripping, described above, when the turbocharger housing W is processed, positioning in the axial direction is performed using the end surface Z of the small diameter hole 25, as shown in FIG. 10. Therefore, the turbocharger housing W gripped by the jaw 28 of the chuck is gripped with the end surface Z of the small diameter hole 25 as the reference in the axial direction. The end surface Z is a position differing from the reference in the axial direction of the turbocharger housing W during casting (end surface Y of the large diameter hole 22). Therefore, in the processing of the turbocharger housing W, as shown in FIG.

10, a constant processing measurement can be obtained with the end surface Z as the reference.

Here, the turbocharger housing W formed by casting is formed as follows. For example, the cast is divided horizontally when casting. In a state in which the core for acquiring the inner shape is disposed in a predetermined position within a cavity in the cast, the upper cast and the lower cast are combined and the cavity is formed. Molten metal is poured into the cavity. Therefore, when the upper cast and the lower cast are combined, minute misalignment cannot be avoided. In the cast turbocharger housing W itself, a minute misalignment occurs between the upper cast and the lower cast. In other words, misalignment occurs at a parting line between the upper cast and the lower cast.

The misalignment occurring at the parting line between the upper cast and the lower cast affects the outer shape of the turbocharger housing W as a formation misalignment between the upper cast portion and the lower cast portion, as magnified and shown in FIG. 10. Therefore, unless the formation misalignment is taken into consideration when the finishing processing is performed, misalignment with the axial center of the large diameter hole 22 of the turbocharger housing W occurs and components cannot be processed into a consistent shape.

However, in the conventional work gripping device, a position differing from the reference (the inner circumferential surface X of the large diameter hole 22 and the end surface Y of the large diameter hole 22) for the shape during casting is used as the reference (the inner circumferential surface X of the large diameter hole 22 and the end surface Z of the small diameter hole 25) for processing. Therefore, processing cannot be accurately performed for the formation misalignment occurring during casting.

Therefore, when processing is performed by a machine tool, such as a numerically controlled (NC) lathe, to correct a numerical amount of formation misalignment during processing, first, shape dimensions of the turbocharger housing W is measured and a value of misalignment by the formation misalignment is calculated. The calculated misalignment value is entered into a program. The cutting processing is performed while the misalignment is corrected using the program.

Therefore, a preparation procedure prior to processing or, in other words, measurement of the shape dimensions of the turbocharger housing W subjected to the processing, calculation of the formation is alignment, and program input, requires large amounts of effort and time.

Thus, a gripping method for the turbocharger housing and a work gripping device that can accurately grip the turbocharger housing, formed by the casting subjected to processing, using the reference for the shape when casting, when the inner diameter is gripped during processing, is demanded.

The present invention has been achieved in light of such issues. An object of the invention is to provide a gripping method for a turbocharger housing and a work gripping device that can accurately grip a turbocharger housing using a reference for a shape when casting, when an inner diameter is gripped during processing.

Means of Solving the Problems

To achieve the above-described object, an aspect of gripping method for a turbocharger housing of the invention is a gripping method for a turbocharger housing used to process a turbocharger housing formed by casting. The turbocharger housing includes a scroll formed in a spiral shape from an axial center, and a large diameter hole and a small diameter hole provided along an axial direction of the scroll with space therebetween, such as to face each other. In the gripping method for a turbocharger housing, after positioning of the turbocharger housing is performed using a surface of the large diameter hole facing the small diameter hole as a reference surface for positioning in the axial direction, an inner diameter of the large diameter hole is gripped.

In a preferred aspect of the invention, the gripping method for a turbocharger housing performs pre-positioning of the turbocharger housing in the axial direction using a surface of the small diameter hole facing the large diameter hole as a reference surface for pre-positioning in the axial direction, before performing the positioning using the surface of the large diameter hole facing the small diameter hole as the reference surface for positioning in the axial direction.

An aspect of a work gripping device of the invention is a work gripping device including a body, a plunger, a jaw, and a pusher. The body is cylindrical. One end side of the body is a work attaching side. The plunger is provided in an inner hole of the body such as to be allowed to move back and forth along an axial direction of the body. The jaw includes a gripping surface that grips a work. The jaw is provided on an end surface of the body on the work attaching side such as to move back and forth along a radial direction of the body in tandem with movement of the plunger. The pusher presses the work in a direction away from the body in accompaniment with a movement of the plunger to the work attaching side. The jaw includes a contact surface that projects in an outward radial direction of the body from an end edge of the gripping surface away from the body. The pusher presses the work to the contact surface in accompaniment with the movement of the plunger to the work attaching side. The gripping surface grips an inner diameter of the work.

In a preferred aspect of the invention, the jaw is divided into a jaw main body and a top jaw fixed onto the jaw main body such as to be freely attached and detached. The top jaw includes the contact surface and the gripping surface.

In a preferred aspect of the invention, the pusher is provided in the plunger such as to be allowed to move along a movement direction of the plunger. The pusher is always biased to towards the work attaching side by a biasing force from a spring. Preferably, the pusher is provided in the plunger such as to be allowed to move along a movement direction of the plunger and is provided such as to be allowed to move along the movement direction of the plunger by fluid pressure, in addition to the movement of the plunger. Preferably, a switch for supplying fluid to make the pusher move in tandem with the movement of the plunger is provided on a supply flow path of a fluid that moves the pusher.

Effect of the Invention

In the gripping method of a turbocharger housing of the present invention, an inner diameter of the large diameter hole is gripped after positioning of the turbocharger housing in the axial direction is performed using an end surface of the large diameter hole facing the small diameter hole as a reference surface for positioning in the axial direction. Therefore, the turbocharger housing can be accurately gripped using a reference for shape during casting when gripping the inner diameter during processing. As a result, the reference for processing and the reference for the shape during casting are the same. Advantageous effects can be achieved, such as the turbocharger housings being mass produced with equal precision. Misalignment between the upper cast and the lower cast is not required to be measured. Correction during processing using the program is not required to be performed.

Therefore, the preparation time required before processing can be shortened. Tact time can be shortened. Manufacturability can be enhanced and cost can be reduced easily and with certainty.

In the work gripping device of the invention, advantageous effects can be achieved, such as the gripping method for a turbocharger housing of the invention being easily and accurately performed.

Therefore, in the gripping method for a turbocharger housing and the work gripping device of the invention, significantly advantageous effects can be achieved, such as accurate gripping being performed using the reference for the shape during casting when gripping the inner diameter during processing.

BEST MODE FOR CARRYING OUT THE INVENTION

Embodiments of the present invention will be described in detail, with reference to the drawings.

Figure 1:
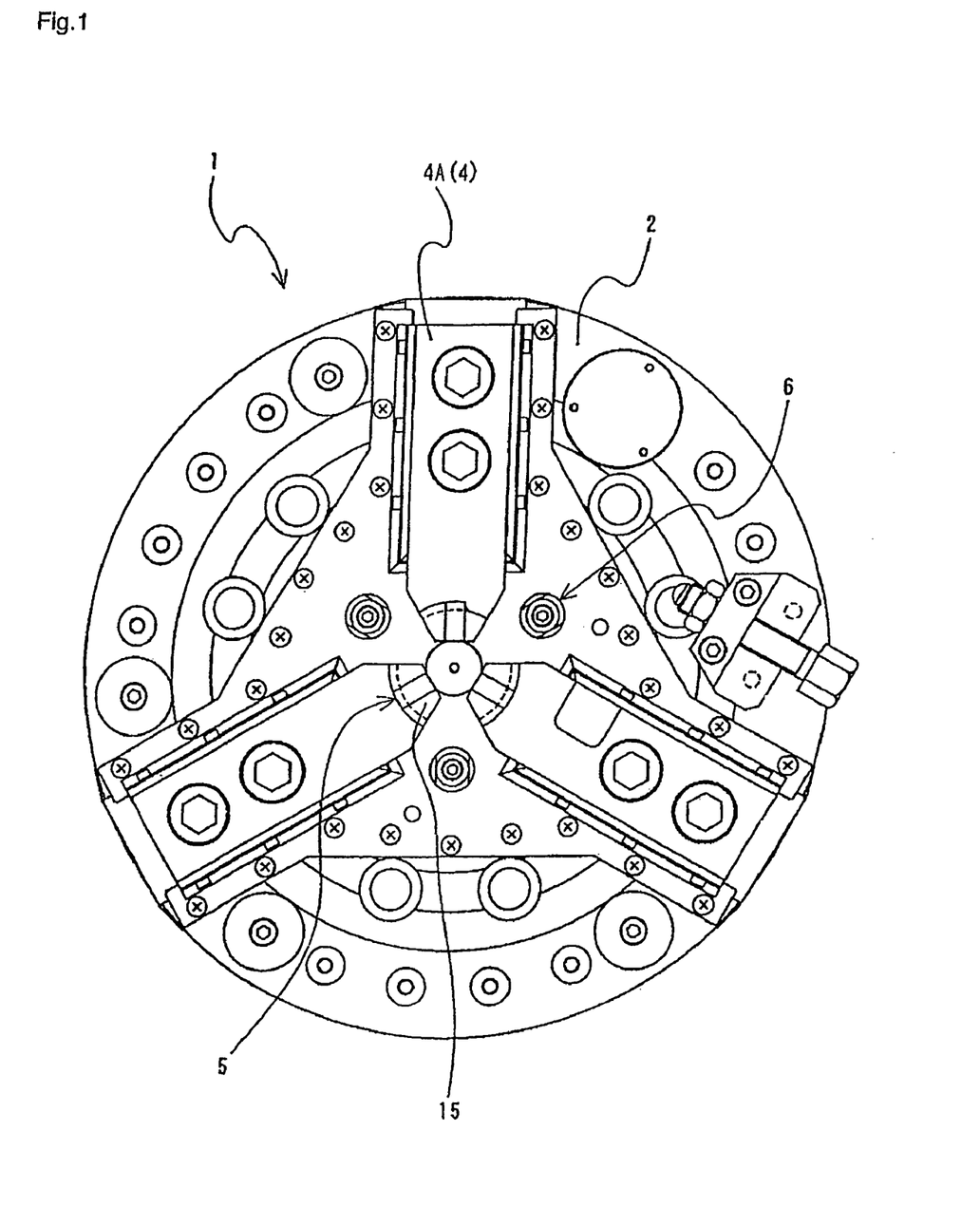
FIG. 1 is a front view of main components of a work gripping device according to an embodiment of the present invention.
Figure 2:
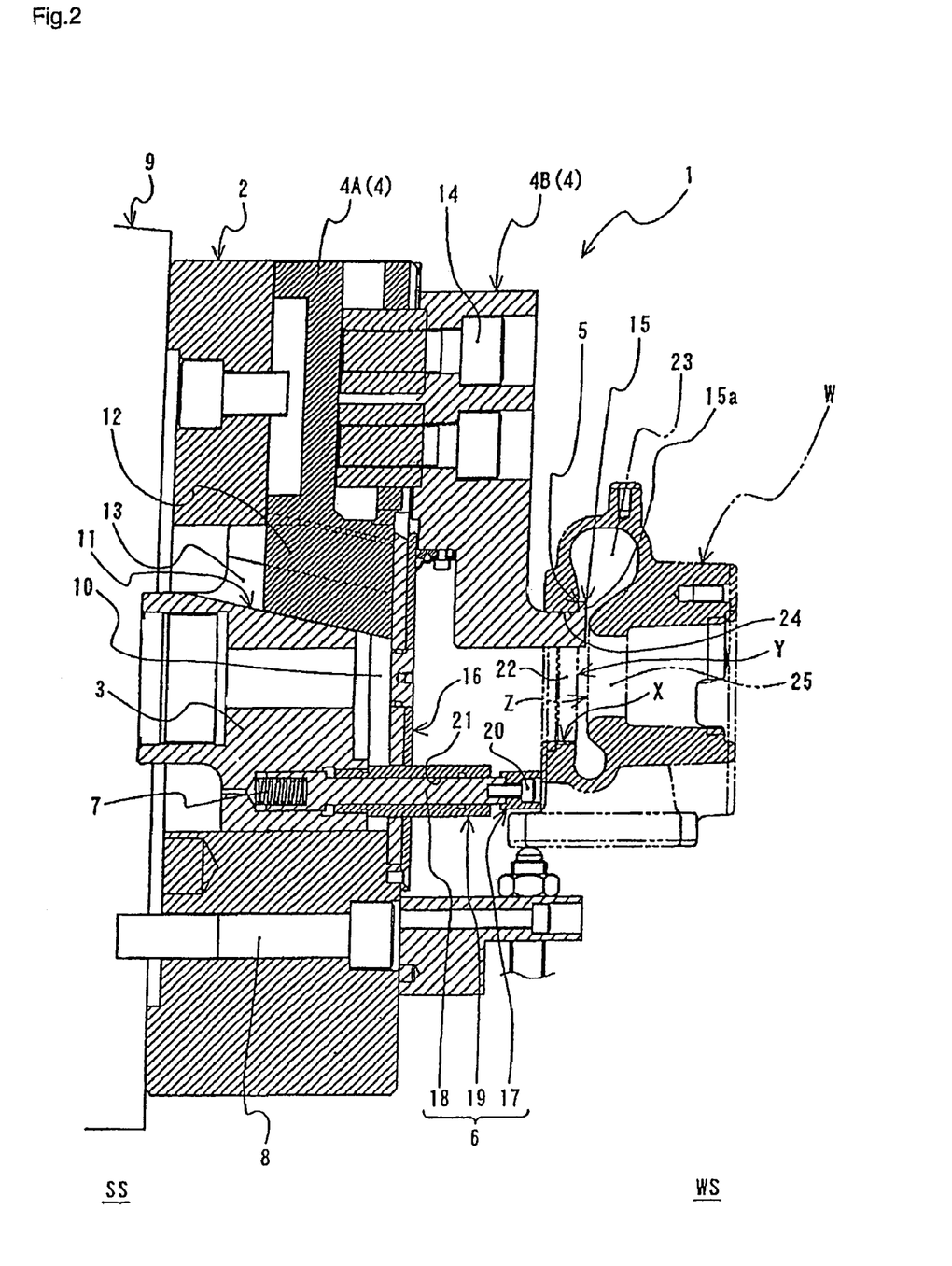
FIG. 2 is an enlarged cross-sectional view of the main components of the work gripping device according to the embodiment shown in FIG. 1, in a work gripping state in which a turbocharger housing is gripped.

FIG. 1 and FIG. 2 show a work gripping device according to an embodiment of the present invention. FIG. 1 is a front view of main components. FIG. 2 is an enlarged cross-sectional view of the main components in a work gripping state in which a turbocharger housing is gripped.

As shown in FIG. 1 and FIG. 2, a chuck 1 serving as the work gripping device according to the embodiment has an almost cylindrical body 2. The body 2 is attached to a main axis 9 of a machine tool, such as an NC lathe, by a plurality of chuck attaching bolts 8 (only one bolt is shown in FIG. 2). A right end side that is one end side of the body 2, shown on the right-hand side in FIG. 2, is a work attaching side WS to which a turbocharger housing W, serving as a work, is attached. A left end side that is another end side of the body 2, shown on the left-hand side in FIG. 2, is a main axis attaching side SS that is attached to the main axis 9.

A plunger 3 is provided in an inner hole 10 of the body 2 such as to slide freely in an axial direction indicated by the horizontal direction in FIG. 2. The plunger 3 is provided such as to be allowed to move back and forth along the axial direction of the body 2 by a driving force from a cylinder (not shown), such as an actuator.

Three jaws 4 are provided on a front surface, shown on the right in FIG. 2, that is an end surface of the body 2 on the work attaching side WS. The jaws 4 are allowed to move back and forth along a radial direction of the body 2. The jaws 4 are disposed at equal angles such that a distance between centers of two adjacent jaws 4 is equal, in positions that are at an equal distance from an axial center of the body 2. A wedge component 12 having a T-shaped cross-section is provided. In the plunger 3, a T-shaped guiding groove 13 is provided in three wedge sections 11. The wedge component 12 of the jaw 4 engages with the guiding groove 13. The plunger 3 and the jaw 4 operate as a wedge and are fitted together.

The jaw 4 according to the embodiment is divided into a jaw main body 4A and a top jaw 4B. The wedge component 12 is provided in the jaw main body 4A. A gripping surface 24 that grips an inner diameter of the turbocharger housing W is provided on the top jaw 4B. The top jaw 4B is fixed onto a front surface, shown on the right side in FIG. 2, positioned on the work attaching side WS of the jaw main body 4A. The top jaw 4B is fixed by a plurality of fixing bolts 14, such as to be freely attached and detached.

The overall top jaw 4B is roughly L-shaped, having one piece that is attached to the jaw main body 4A by the fixing bolts 14 and another piece that extends in the axial direction to the work attaching side WS, shown on the right in FIG. 2. The gripping surface 24 and a projection 15 are provided on the side of the piece extending in the axial direction to the work attaching side WS. The gripping surface 24 faces an outward radial direction. The projection 15 projects to an outward radial direction side of the body 2 from a right end edge of the gripping surface 24. The right end edge is an end edge separated from the body 2. The gripping surface 24 comes into contact with an inner circumferential surface X of a large diameter hole 22 of the turbocharger housing W. A thickness of the projection 15 in the horizontal direction in FIG. 2 being smaller (thinner) than a distance between an end surface Y of the large diameter hole 22 and an end surface Z of a small diameter hole 25 is vital for ensuring and facilitating performance of an operation in which the projection 15 is positioned between the end surface Y of the large diameter hole 22 and the end surface Z of the small diameter hole 25 and a contact surface 5 comes into contact with the end surface Y, as described hereafter.

The contact surface 5 is positioned on the body 2 side of the projection 15 and provided on a rear surface on the main axis attaching side SS in the axial direction, shown on the left in FIG. 2. The contact surface 5 comes into contact with the end surface Y. The end surface Y serves as a reference for the shape of the turbocharger housing W during casting, in a gripping state in which the turbocharger housing subjected to processing is gripped. In other words, the contact surface 5 that projects in the outward radial direction of the body 2 is provided on the top jaw 4B on the end edge of the gripping surface 24 away from the body 2.

A cover 16 is provided on the front surface positioned on the work attaching side WS of the body 2. The cover 16 covers the inner hole 10 into which the plunger 3 is inserted.

A plurality of pushers 6 (three according to the embodiment) are provided in the plunger 3 such as to project to the work attaching side WS, shown on the right in FIG. 2. The pushers 6 are used to press the turbocharger housing W in a direction away from the front surface shown on the right of the body 2 in FIG. 2. In other words, the pushers 6 press the turbocharger housing W in a direction away from the body 2. The pushers 6 are used to press the turbocharger housing W, serving as the work, in the work attaching side WS direction, shown on the right in FIG. 2. The pushers 6 are disposed at equal angles in positions that are at an equal distance from the axial center of the body 2. The pusher 6 includes a pusher piece 17, a shaft 18, a guide shaft 19, and a spring 7. The pusher piece 17 comes into contact with the turbocharger housing W. The pusher piece 17 is attached to a front tip end of the shaft 18 by a bolt 20, such as to be freely attached and detached. The shaft 18 is provided such as to slide freely along the axial direction shown in the horizontal direction in FIG. 2. The guide shaft 19 guides the shaft 18 along the axial direction. The spring 7 serves as a biasing means that constantly biases the shaft 18 towards the work attaching side WS, shown on the right in FIG. 2.

The guide shaft 19 is fixed onto the plunger 3 such as to project to the work attaching side WS, parallel in the axial direction. The guide shaft 19 moves in the horizontal direction in FIG. 2, in accompaniment with the movement of the plunger 3 in the axial direction. The shaft 18 penetrates a through hole 21 provided in the guide shaft 19. As a result, the shaft 18 is held such as to slide freely along the axial direction of the plunger 3.

The spring 7 is, for example, formed by a compression coil spring. The spring 7 is provided between an end of the shaft 18 and the plunger 3. The spring 7 constantly biases the shaft 18 in a front direction, shown on the right in FIG. 2, namely towards the work attaching side WS, using a spring load as a biasing force.

In other words, the pusher 6 is provided in the plunger 3 such as to be allowed to move along a movement direction of the plunger 3. The pusher 6 is constantly biased towards the work attaching side WS by the biasing force of the spring 7.

The pusher 6 is only required to be provided in the plunger 3 such as to be allowed to move along the movement direction of the plunger 3. For example, the pusher 6 can not only be provided in the plunger 3 such as to be allowed to move along the movement direction of the plunger 3, but also can be provided such as to be allowed to move along the movement direction of the plunger 3 by fluid pressure, such as compressed air and hydraulic fluid, in addition to the movement of the plunger 3. A reciprocating actuator is given as a specific example. The reciprocating actuator includes a piston rod that expands and contracts by fluid pressure. In this case, a switch is provided on a supply flow path of a fluid that operates the pusher 6. The switch includes, for example, an operating valve for supplying the fluid such as to make the pusher 6 move in tandem with the movement of the plunger 3. As a result, as described hereafter, the pressing force from the pusher 6 used to press the turbocharger housing W in the direction away from the body 2, towards the work attaching side WS, can be generated with certainty compared to when the biasing force from the spring 7 is used. Furthermore, modifications and adjustment of the pressing force can be made more easily through operation on the supply side. Coordinated movement of the pusher 6 with the movement of the plunger 3 can be easily made through control of fluid pressure using a control value. The control is performed by a control instruction from a controlling section including a central processing unit (CPU) and a memory. The CPU serves as an operation section. The memory serves as a storage section storing programs and data. Electrical power can be used instead of the fluid pressure as required by a design concept and the like.

Other configurations are the same as conventionally known power chucks, such as an oil-pressure chuck. Detailed explanations thereof are omitted.

Next, an effect of the embodiment configured as described above will be described with a gripping method of the turbocharger housing according to the embodiment.

The gripping method of the turbocharger housing according to the embodiment is performed using the above-described conventional turbocharger housing W shown in FIG. 8 and FIG. 9 and the chuck. The turbocharger housing W is formed by casting. The chuck serves as the above-described work gripping device according to the embodiment, shown in FIGS. 1 and 2.

In other words, when the turbocharger housing W is gripped using the chuck 1 serving as the work gripping device according to the embodiment, first, the large diameter hole 22 of the turbocharger housing W is fitted onto the jaw 4 of the chuck or the top jaw 4B according to the embodiment, manually or using a robot.

At this time, the chuck 1 is maintained in a wait state shown in FIG. 2. In the wait state, the plunger 3 is retracted to the main axis side SS. The jaw 4 that moves back and forth along the radial direction of the body 2 in tandem with the plunger 3 moves in an inward radial direction. A diameter size connecting the projection 15 of each top jaw 4B is smaller than the diameter size of the large diameter hole 22. A gap is respectively formed between the gripping surface 24 of the top jaw 4B and the large diameter. hole 22 and between an outer circumference of the projection 15 and the large diameter hole 22. The gaps are required to fit the large diameter hole 22 of the turbocharger housing W onto the top jaw 4B of the chuck 1. The pusher 6 that presses the turbocharger housing W in the direction away from the body 2 in accompaniment with the movement of the plunger 3 is retracted to the main axis side SS. A tip of the pusher piece 17 projecting from the plunger 3 to the work attaching side WS can be maintained in a state separated from the inserted turbocharger housing W.

The insertion of the turbocharger housing W is performed until the projection 15 of the top jaw 4B reaches a position that is further to the work attaching side WS than the end surface Y. The end surface Y is one of the references for the shape when the turbocharger housing W is cast. A work insertion state is entered.

The insertion of the turbocharger housing W into the top jaw 4B of the chuck 1 is restricted by a tip surface 15a of the projection 15 of the top jaw 4B, shown on the right in FIG. 2, coming into contact with the end surface Z of the small diameter hole 25.

In other words, as a result of the tip surface 15a of the projection 15 of the top jaw 4B coming into contact with the end surface Z of the small diameter hole 25, positioning in the axial direction that is the insertion direction of the turbocharger housing W can be performed.

At this time, the contact surface 5 of the projection 15 of the top jaw 4B is positioned closer to the work attaching side WS than the end surface Y of the large diameter hole 22 and is separated.

Therefore, the end surface Z of the small diameter hole 25 that faces the large diameter hole 22 serves as a reference surface for a pre-positioning in the, axial direction that is the insertion direction of the turbocharger housing W. The pre-positioning is performed before the gripping surface 24 of the top jaw 4B grips the inner diameter of the large diameter hole 22. Pre-positioning in the axial direction of the turbocharger housing W is performed with the end surface Z serving as the reference surface for pre-positioning in the axial direction. As a result, an insertion position (insertion amount) of the turbocharger housing W to the top jaw 4B of the chuck 1 can be easily controlled.

In other words, in the gripping method for the turbocharger housing W according to the embodiment, before positioning is performed with the end surface Y of the large diameter hole 22 that faces the small diameter hole 25 serving as the reference surface in the axial direction, described hereafter, pre-positioning in the axial direction of the turbocharger housing W is performed with the end surface Z of the small diameter hole 25 that faces the large diameter hole 33 serving as the reference surface for pre-positioning in the axial direction.

Figure 3:
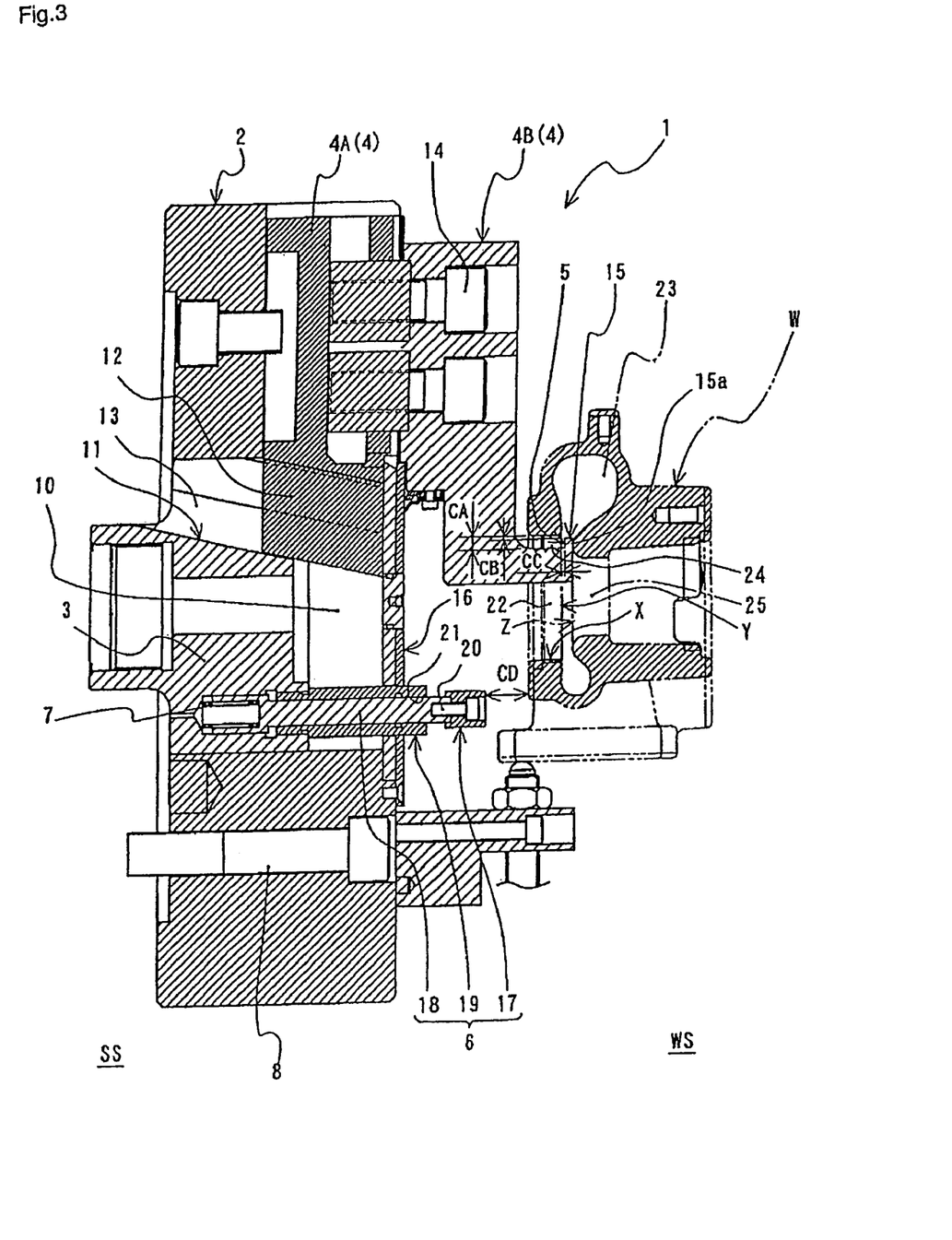
FIG. 3 is an enlarged cross-sectional view of main components in a work insertion state in a gripping method for a turbocharger housing according to an embodiment of the invention.

FIG. 3 shows a work insertion state in which the turbocharger housing W is inserted into the chuck 1. In FIG. 3, reference number CA indicates a gap between the gripping surface 24 and the inner circumferential surface Xo f the large diameter hole 22 in the radial direction. Reference number CB indicates a gap between the outer circumference of the projection 15 and the inner circumferential surface X of the large diameter hole 22 in the radial direction. Reference number CC indicates a gap between the contact surface 5 and the end surface Y of the large diameter hole 22 in the axial direction. Reference number CD indicates a gap between the tip of the pusher piece 17 of the pusher 6 and the turbocharger housing W in the axial direction.

When the turbocharger housing W is in the work insertion state, fitting of the large diameter hole 22 onto the projection 15 of the top jaw 4B of the chuck 1 is completed. The jaw 4 starts to grips the inner diameter as follows.

Gripping of the inner diameter of the turbocharger housing W starts when a driving source (not shown), such as a cylinder, moves the plunger 3 in a forward axial direction or, in other words, to the work attaching side WS, shown on the right in FIG. 2. With the movement of the plunger 3, the jaw 4 starts to move in the outward radial direction as a result of a wedge effect of the wedge component 12 of the jaw 4 . The wedge component 12 is engaged with the guiding groove 13 of the wedge section 11 provided at an angle in the plunger 3. As a result, the top jaw 43 attached to the jaw 4 similarly starts to move in the outward radial direction. The pusher 6 fixed onto the plunger 3 starts to move in the forward axial direction or, in other words, to the work attaching side WS, shown on the right in FIG. 2, in tandem with the movement of the plunger 3.

As a result of the movement of the plunger 3 to the work attaching side WS, the projection 15 provided on the tip of the top jaw 4B moves in the outward radial direction. When a distance between the projection 15 and the center of the outer circumferential surface within the scroll 23 exceeds the radius of the large diameter hole 22, the gap CB (FIG. 3) between the outer circumference of the projection 15 and the large diameter hole 22 closes. A work hooked state is entered.

At this time, as a result of the movement of the jaw 4 in the outward radial direction, the gripping surface 24 is separated from the large diameter hole 22, even while becoming closer to the large diameter hole 22. In other words, the gap CA between the gripping surface 24 and the inner circumferential surface X of the large diameter hole 22 gradually decreases.

The gap CC between the contact surface 5 and the large diameter hole 22 remains unchanged and in the work insertion state. The tip of the pusher piece 17 of the pusher 6 is separated from the turbocharger housing W, even while becoming closer to the turbocharger housing W. In other words, the gap CE between the tip of the pusher piece 17 and the turbocharger housing W gradually decreases.

Figure 4:
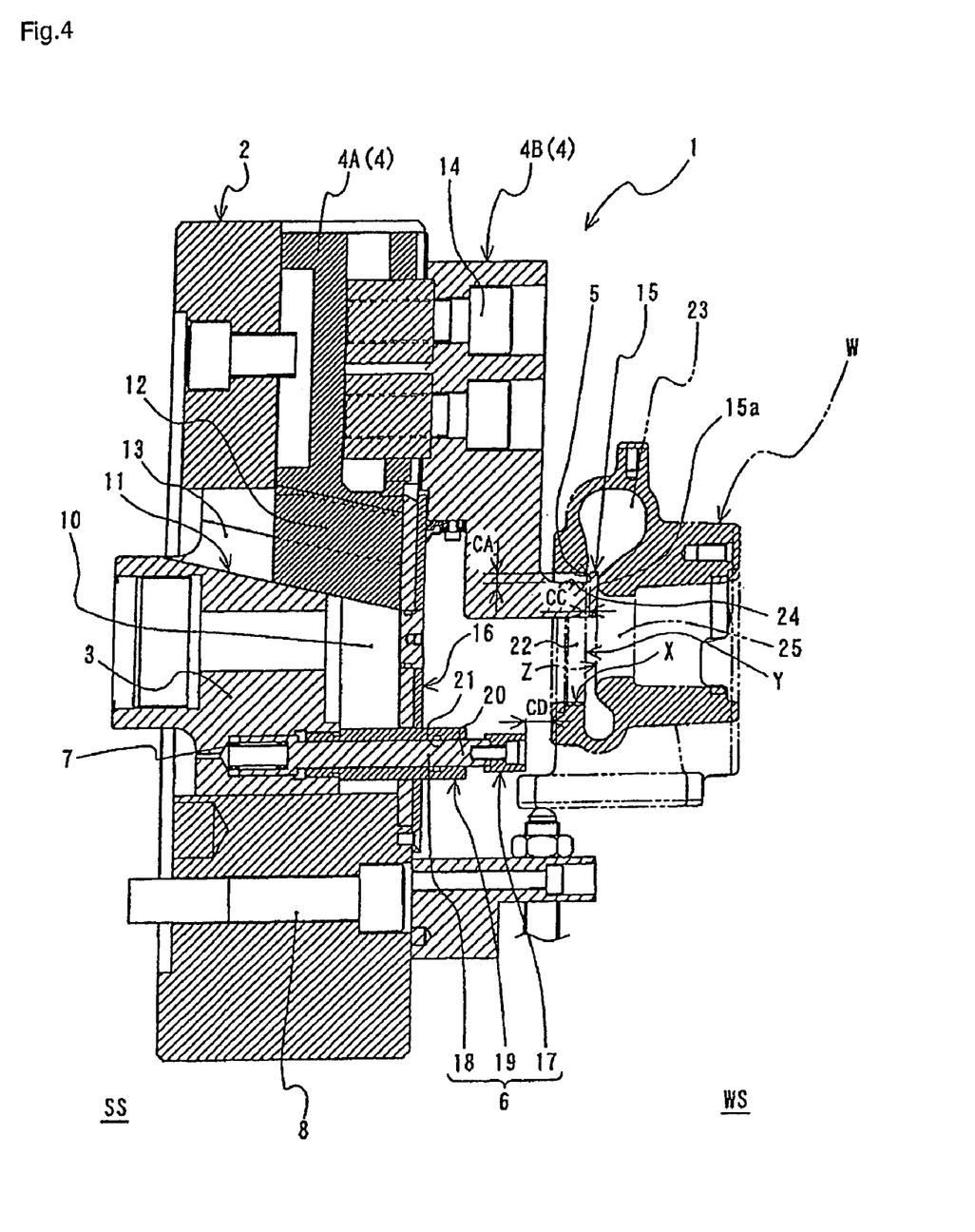
FIG. 4 is a diagram similar to FIG. 3 showing the main components in a work hooked state following the work insertion state in the gripping method for a turbocharger housing according to the embodiment of the invention.

FIG. 4 shows the work hooked state in which the projection 15 provided on the tip of the top jaw 4B moves in the outward radial direction and the distance between the projection 15 and the center of the outer circumferential surface within the scroll 23 exceeds the radius of the large diameter hole 22.

As a result of further movement of the plunger 3 in the axial direction to the work attaching side WS, the tip of the pusher piece 17 comes into contact with the turbocharger housing W. The gap CE between the tip of the pusher piece 17 and the turbocharger housing W closes. A work contact state is entered.

At this time, as a result of further movement of the jaw 4 in the outward radial direction, the gripping surface 24 is separated from the large diameter hole 22, even while becoming closer to the large diameter hole 22. In other words, the gap CA between the gripping surface 24 and the large diameter hole 22 further decreases. The gap CC between the contact surface 5 and the end surface Y of the large diameter hole 22 remains unchanged and in the work insertion state.

Figure 5:
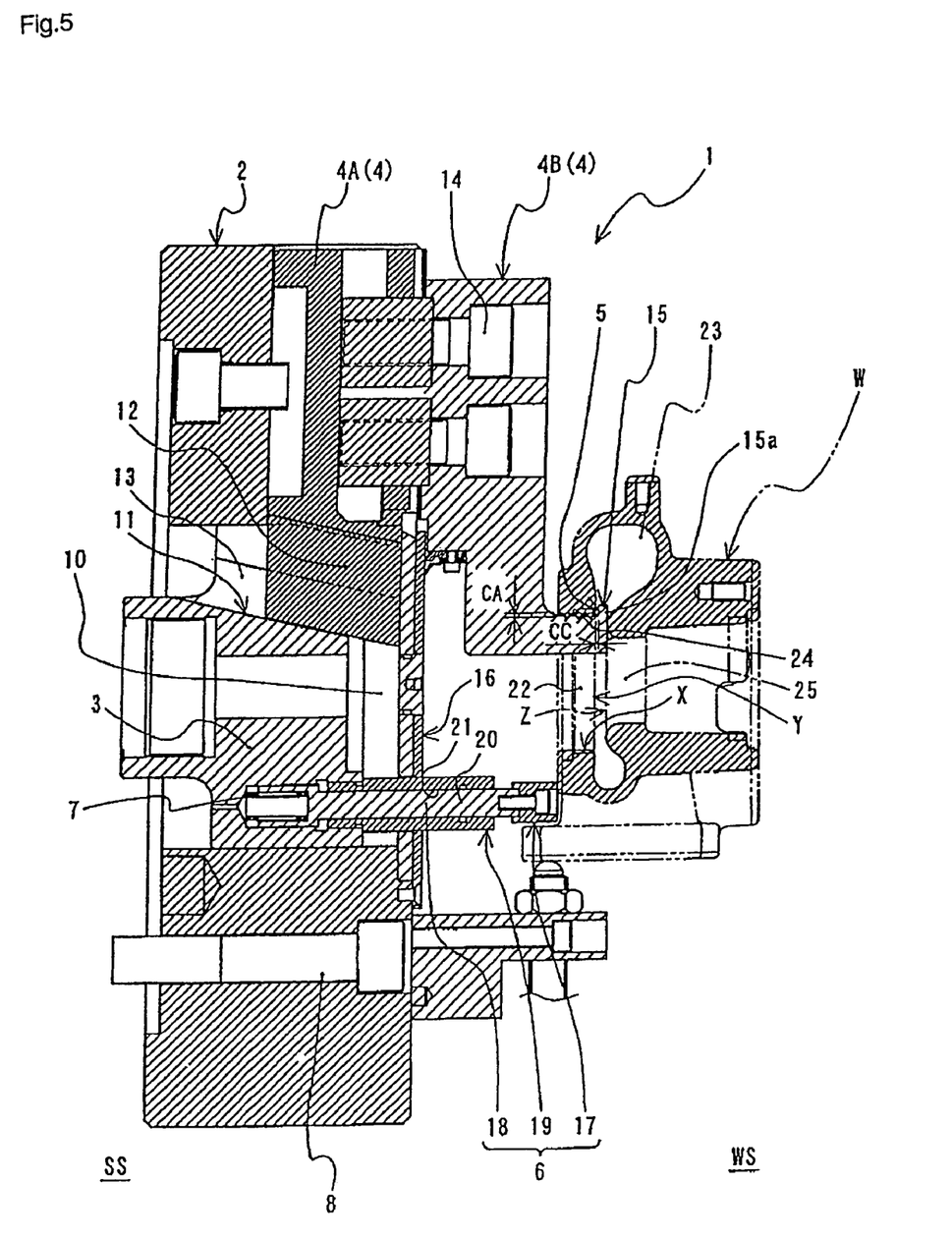
FIG. 5 is a diagram similar to FIG. 3 showing the main components in a work contact state following the work hooked state in the gripping method for a turbocharger housing according to the embodiment of the invention.

FIG. 5 shows the work contact state in which the pusher 6 is in contact with the turbocharger housing W.

As a result of further movement of the plunger 3 in the axial direction to the work attaching side WS, the pusher piece 17 presses the turbocharger housing W to the work attaching side WS, shown on the right in FIG. 2, using the biasing force from the spring 7. The turbocharger housing W starts to move in the direction away from the body 2, shown on the right in FIG. 2. As a result of the movement of the turbocharger housing W, the end surface Y of the large diameter hole 22 comes into contact with the contact surface 5 provided on the projection 15 of the top jaw 4B. A work axial direction positioning state is entered.

At this time, the movement of the turbocharger housing W in the direction away from the body 2 is restricted by the end surface Y of the large diameter hole 22 coming into contact with the contact surface 5 provided on the projection 15 of the top jaw 4B.

In other words, as a result of the contact surface 5 provided on the projection 15 of the top jaw 4B making contact with the end surface Y of the large diameter hole 22, positioning in the axial direction is made . As a result, the gap CC between the contact surface 5 and the end surface Y of the large diameter hole 22 closes. Instead, a gap CE between the tip surface 15a of the projection 15 and the end surface Z is formed.

Therefore, the end surface Y of the large diameter hole 22 facing the small diameter hole 25 can be used as a reference during processing.

At this time, as a result of further movement of the jaw 4 in the outward radial direction, the gripping surface 24 is separated from the large diameter hole 22, even while becoming closer to the large diameter hole 22. In other words, the gap CA between the gripping surface 24 and the large diameter hole 22 further decreases. As a result of further movement of the plunger 3 to the work attaching side WS, the jaw 4 moves in the outward radial direction. The projection 15 provided on the tip of the top jaw 4B moves further in the outward radial direction within the scroll 23.

Therefore, in the gripping method for the turbocharger housing W according to the embodiment, the positioning of the turbocharger housing W in the axial direction can be made with the end surface Y of the large diameter hole 22 facing the small diameter hole 25 as the reference surface for positioning in the axial direction.

Figure 6:
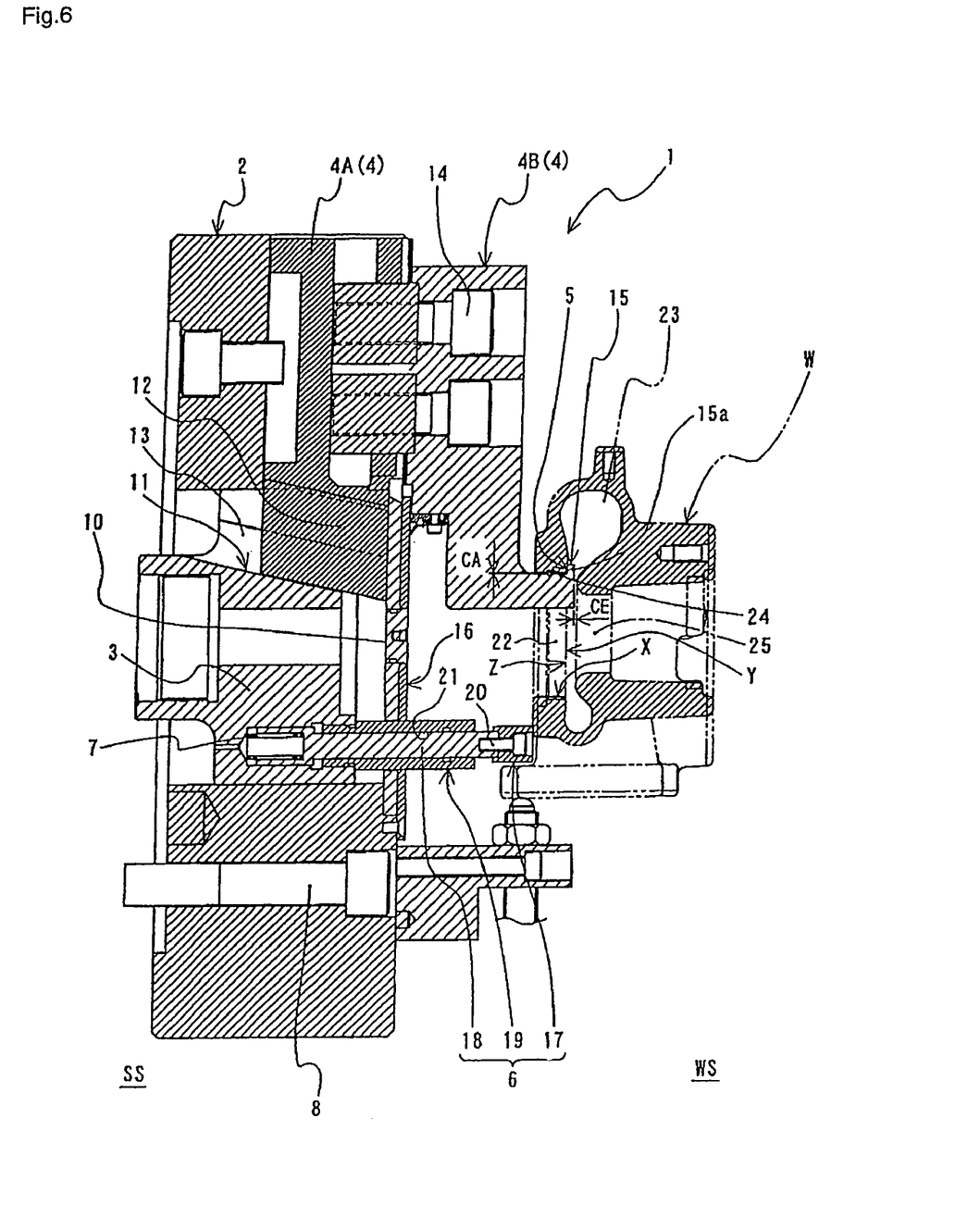
FIG. 6 is a diagram similar to FIG. 3 showing the main components in a work axial direction positioning state following the work contact state in the gripping method for a turbocharger housing according to the embodiment of the invention.

FIG. 6 shows the work axial direction positioning state in which the end surface Y of the large diameter hole 22 comes into contact with the contact surface 5 provided on the projection 15 of the top jaw 4B.

Figure 7:
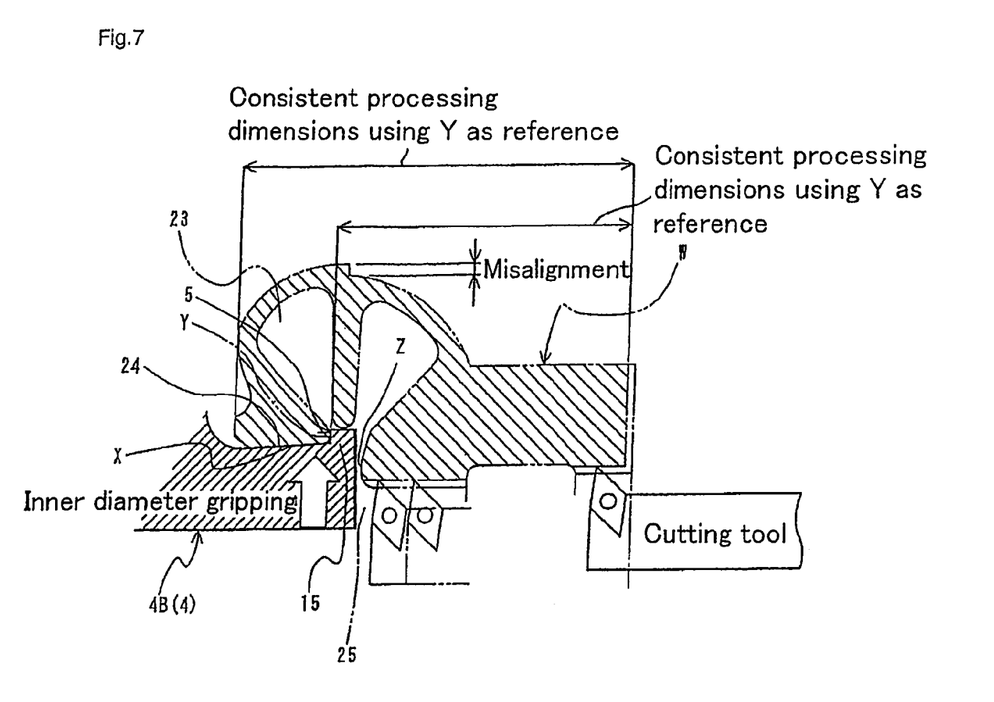
FIG. 7 is an enlarged partial cross-sectional view of the main components in a work gripping state following the work axial direction positioning state in the gripping method for a turbocharger housing according to the embodiment of the invention.

When the plunger 3 further moves in the axial direction to the work attaching side WS, the jaw 4 moves in the outward radial direction. The gripping surface 24 provided on the top jaw 4B comes into contact with the outer circumferential surface X of the turbocharger housing W. A work inner diameter gripping state shown in FIG. 2 is entered. FIG. 7 shows an enlarged view of the main components in the work inner diameter gripping state.

Therefore, in the work inner diameter gripping state, the inner circumferential surface X of the large diameter hole 22 and the end surface Y of the large diameter hole 22 are used as the references during processing.

At this time, the pusher piece 17 presses the turbocharger housing W towards the work attaching side WS. The pusher piece 17 tries to apply excessive pressing force between the contact surface 5 of the projection 15 and the portion of the end surface Y in contact with the projection 15. However, the excessive pressing force is absorbed by the spring 7 contracting in the axial direction. As a result, the excessive pressing force is not applied to either the projection 15 or the portion of the end surface Y in contact with the projection 1, or both. Therefore, damage or breakage of either the projection 15 or the portion of the end surface Y in contact with the projection 1, or both, caused by the movement of the plunger 3 to the work attaching side WS can be prevented with certainty.

In this way, in the gripping method for the turbocharger housing according to the embodiment, when the turbocharger housing W is gripped, the pusher 6 presses the turbocharger housing W in the direction away from the body 2, in accompaniment with the movement of the plunger 3 to the work attaching side WS. The end surface Y comes into contact with the contact surface 5 of the top jaw 4B and the positioning of the turbocharger housing W in the axial direction is made. In addition, the gripping surface 24 provided on the top jaw 4B grips the inner circumferential surface X of the turbocharger housing W. As a result, the turbocharger housing W can be gripped using the inner circumferential surface X and the end surface Y of the large diameter hole 22 as the references. The inner circumferential surface X and the end surface Y are the references for the shape of the turbocharger housing during casting. In other words, in the turbocharger housing W processing, as shown in FIG. 7, consistent processing dimensions can be obtained using the end surface Y as the reference.

Therefore, in the gripping method of the turbocharger housing according to the embodiment, as a result of the turbocharger housing W being gripped using the inner circumferential surface X of the turbocharger housing W and the end surface Y of the large diameter hole 22 as the references, as shown in detail in FIG. 7, dimensions in the axial direction during processing can be accurately obtained from the inner circumferential surface X that is the reference for casting. Therefore, high processing accuracy can be achieved.

In other words, in the conventional work gripping device shown in FIG. 10, the reference for gripping the turbocharger housing W is only a single surface, the inner circumferential surface X. Therefore, when the turbocharger housing W is gripped, accurate centering is difficult to perform. However, in the gripping method for the turbocharger housing according to the embodiment, the positioning of the turbocharger housing W in the axial direction is performed using the end surface Y of the large diameter hole 22 facing the small diameter hole 25 as the reference surface for positioning in the axial direction. Then the inner diameter of the large diameter hole 22 is gripped. Therefore, the turbocharger housing W is gripped using two reference surfaces, the inner circumferential surface X and the end surface Y of the large diameter hole 22, required for processing. Moreover, these references are references for the shape during casting. Therefore, centering can be performed with further accuracy.

Therefore, in the gripping method for the turbocharger housing according to the embodiment, the references for processing and the references for the shape are the same. Turbocharger housings W can be mass-produced with equal precision. Misalignment between the upper cast and the lower cast is not required to be measured. Correction during processing using the program is not required to be performed. Therefore, the preparation time required before processing can be shortened. Tact time can be shortened. Manufacturability can be enhanced and cost can be reduced easily and with certainty.

In the gripping method for the turbocharger housing according to the embodiment, pre-positioning of the turbocharger housing W in the axial direction using the end surface Z of the small diameter hole 25 facing the large diameter hole 22 as the reference surface for pre-positioning in the axial direction can be performed before the positioning using the end surface Y of the large diameter hole 22 facing the small diameter hole 25 as the reference surface in the axial direction. Therefore, the insertion position (insertion amount) of the turbocharger housing W to the top jaw 4B of the chuck 1 can be easily controlled.

The chuck 1 serving as the work gripping device according to the embodiment is cylindrical. The chuck 1 includes the body 2, the plunger 3, the jaw 4, and the pusher 6. One end side of the body 2 is the work attaching side WS. The plunger 3 is provided in the inner hole 10 of the body 2, such as to be allowed to move back and forth along the axial direction of the body 2. The jaw 4 includes the gripping surface 24 that grips the turbocharger housing W serving as the work. The jaw 4 is provided on the end surface of the body 2 on the work attaching side WS, such as to be allowed to move back and forth along the radial direction of the body 2, in tandem with the plunger 3. The pusher 6 presses the turbocharger housing W in the direction away from the body 2 in accompaniment with the movement of the plunger 3 to the work attaching side WS. The jaw 4 includes the contact surface 5 that projects in the outward radial direction of the body 2 from the end edge of the gripping surface 24 away from the body 2. The pusher 6 presses the turbocharger housing W to the contact surface 5 in accompaniment with the movement of the plunger 3 to the work attaching side WS. The gripping surface 24 grips the inner diameter of the turbocharger housing W. Therefore, the gripping method for the turbocharger housing W according to the embodiment can be easily performed. As a result, manufacturability of the turbocharger housing W can be enhanced and cost can be reduced.

In the chuck 1 serving as the work gripping device according to the embodiment, the jaw 5 is divided into the jaw main body 4A and the top jaw 4B. The top jaw 4B is fixed onto the jaw main body 4A such as to be freely attached and detached. The top jaw 4B includes the contact surface 5 and the gripping surface 24. Therefore, the inner diameter of various turbocharger housings W having a large diameter hole 22 of differing sizes and a scroll 23 of differing shapes and sizes can be easily gripped by a simple method of exchanging the top jaw 4B set in advance with another top jaw 4B. In other words, versatility can be enhanced.

The present invention is not limited to a turbocharger housing formed by casting. The invention can be used in various devices that grip the inner diameter of various castings in which formation misalignment occurs and process the casting.

The present invention is not limited to the above-described embodiment. Various modifications can be made as required.

What is claimed is:

1. A work gripping device comprising:
a body that is cylindrical and of which one end side is a work attaching side;
a plunger that is provided in an inner hole of the body such as to be allowed to move back and forth along an axial direction of the body;
a jaw that includes a gripping surface that grips a work and is provided on an end surface of the body on the work attaching side such as to move back and forth along a radial direction of the body in tandem with movement of the plunger; and
a pusher that presses the work in a direction away from the body in accompaniment with a movement of the plunger to the work attaching side, wherein,
the jaw includes a contact surface that projects in an outward radial direction of the body from an end edge of the gripping surface away from the body,
the pusher presses the work to the contact surface in accompaniment with the movement of the plunger to the work attaching side,
the gripping surface grips an inner diameter of the work, and
the pusher is provided in the plunger such as to be allowed to move along a movement direction of the plunger and is always biased to towards the work attaching side by a biasing force from a spring.

2. The work gripping device according to claim 1, wherein:
the jaw is divided into a jaw main body and a top jaw fixed onto the jaw main body such as to be freely attached and detached, and the top jaw includes the contact surface and the gripping surface.

3. A work gripping device comprising:
a body that is cylindrical and of which one end side is a work attaching side;
a plunger that is provided in an inner hole of the body such as to be allowed to move back and forth along an axial direction of the body;
a jaw that includes a gripping surface that grips a work and is provided on an end surface of the body on the work attaching side such as to move back and forth along a radial direction of the body in tandem with movement of the plunger; and
a pusher that presses the work in a direction away from the body in accompaniment with a movement of the plunger to the work attaching side, wherein,
the jaw includes a contact surface that projects in an outward radial direction of the body from an end edge of the gripping surface away from the body,
the pusher presses the work to the contact surface in accompaniment with the movement of the plunger to the work attaching side,
the gripping surface grips an inner diameter of the work, and
the pusher is provided in the plunger such as to be allowed to move along a movement direction of the plunger and is provided such as to be allowed to move along the movement direction of the plunger by fluid pressure, in addition to the movement of the plunger.

4. The work gripping device according to claim 3, wherein:
a switch for supplying fluid to make the pusher move in tandem with the movement of the plunger is provided on a supply flow path of a fluid that moves the pusher.

5. The work gripping device according to claim 3, wherein:
the jaw is divided into a jaw main body and a top jaw fixed onto the jaw main body such as to be freely attached and detached, and the top jaw includes the contact surface and the gripping surface.

6. The work gripping device according to claim 5, wherein:
a switch for supplying fluid to make the pusher move in tandem with the movement of the plunger is provided on a supply flow path of a fluid that moves the pusher.

* * * * *